(12) United States Patent
Jorasch et al.

(10) Patent No.: US 8,412,589 B2
(45) Date of Patent: Apr. 2, 2013

(54) PHOTOBOOK ENGINE POWERED BY BLOG CONTENT

(75) Inventors: Craig Jorasch, Palo Alto, CA (US); Wiley H. Wang, San Francisco, CA (US)

(73) Assignee: Shutterfly, Inc., Redwood City, CA (US)

( * ) Notice: Subject to any disclaimer, the term of this patent is extended or adjusted under 35 U.S.C. 154(b) by 0 days.

(21) Appl. No.: 13/177,326

(22) Filed: Jul. 6, 2011

(65) Prior Publication Data

US 2012/0036036 A1 Feb. 9, 2012

Related U.S. Application Data

(60) Provisional application No. 61/371,337, filed on Aug. 6, 2010.

(51) Int. Cl.
*G06Q 30/00* (2012.01)
(52) U.S. Cl. ....................... 705/26.5; 705/27.1
(58) Field of Classification Search ......... 705/26.1–27.2
See application file for complete search history.

(56) References Cited

U.S. PATENT DOCUMENTS

| | | | | |
|---|---|---|---|---|
| 6,636,837 | B1 * | 10/2003 | Nardozzi et al. | 705/7.29 |
| 7,747,473 | B1 * | 6/2010 | Mesaros | 705/26.2 |
| 2005/0177441 | A1 * | 8/2005 | Bryant | 705/26 |
| 2005/0289018 | A1 * | 12/2005 | Sullivan et al. | 705/27 |
| 2007/0239610 | A1 * | 10/2007 | Lemelson | 705/51 |
| 2011/0060437 | A1 * | 3/2011 | Durham et al. | 700/97 |

OTHER PUBLICATIONS

Boxer, S. (May 25, 2003). Prospecting for gold among the photo blogs. New York Times.*

* cited by examiner

*Primary Examiner* — Jeffrey A Smith
*Assistant Examiner* — Resha Desai
(74) *Attorney, Agent, or Firm* — Xin Wen (57) ABSTRACT

A computer system for creating a design for an image product includes servers that can identify a blog page that includes an image, text, or designs, automatically incorporate at least one of the image, text, or the design object in the blog page into the design of an image product, and allow a user to review the design of the image product. The servers communicate with a printing finishing facility that makes a physical image product according to the design of the image product.

18 Claims, 9 Drawing Sheets

PHOTOBOOK ENGINE POWERED BY BLOG CONTENT

The present application claims priority to pending U.S. Provisional Patent Application 61/371,337, titled "Photobook engine powered by blog content", filed on Aug. 6, 2010 by the same inventors, the disclosure of which is incorporated herein by reference.

TECHNICAL FIELD

This application relates to utilization of digital images, and more specifically, to the design and creation of products incorporating digital images.

BACKGROUND OF THE INVENTION

In the last decade, photography has been rapidly transformed from chemical based technologies to digital imaging technologies. Images captured by digital cameras can be stored in computers and viewed on display devices. Users can also produce image products based on the digital images. Such products include photo books, photo calendars, photo greeting cards and stationeries, photo mug, photo T-shirt, image prints, and so on. A photo book typically includes a cover page and a plurality of pages containing images. Designing a photobook can include many iterative steps such as selecting suitable images, selecting layout, selecting images for each page, selecting backgrounds, picture frames, overall Style, add text, choose text font, and rearrange the pages, images and text, which can be quite time consuming.

It is desirable to provide methods to allow users to design and produce image products in a time efficient manner. In another aspect, it is also desirable to allow users to create image products using content from different sources.

SUMMARY OF THE INVENTION

The disclosed methods and systems provide ways to save users' time spent on creating image products such as photobooks. The disclosed methods and systems allow users to incorporate content from different sources into their image products. Specifically, users can conveniently incorporate own images, text, and designs from web blog pages, which allows image products to more effectively preserve users' memories.

In one general aspect, the present invention relates to a method for creating a design for an image product. The method includes identifying a blog page that includes an image, text, or designs by a computer system; automatically incorporating at least one of the image, text, or a design object in the blog page into the design of an image product by the computer system; and allowing a user to review the design of the image product, wherein the computer system is configured to communicate with a printing finishing facility at which a physical image product is to be made according to the design of the image product.

Implementations of the system may include one or more of the following. The step of automatically incorporating can include obtaining the number of views received by the blog page; and selecting the blog page based on the number of views. The method can further include enabling the user to publish the blog page by the computer system; and tracking the number of views received by the blog page by the computer system. The step of automatically incorporating can include obtaining the number of votes on the blog page, the image, the text, or the design object; and selecting, by the computer system, the blog page, or at least one of the image, text, or the design object on the blog page based on the number of votes. The method can further include enabling the user to publish the blog page by the computer system; and tracking the number of votes on the blog page by the computer system. The step of automatically incorporating can include determining the image formats of the image by the computer system; automatically selecting a page layout according to the image format of the image; and automatically incorporating the image into the page layout which forms a portion of the design of the image product. The step of automatically incorporating can include determining the image size of the image by the computer system; automatically selecting a page layout according to the image size of the image; and automatically incorporating the image into the page layout which forms a portion of the design of the image product. The method can further include enabling the user to publish the blog page by the computer system. The image product can include a photobook, a photo greeting card, or photo stationery. The blog page can be posted by the user. The method can further include receiving an order from the user for a physical image product; and making the physical image product according to the design of the image product at the printing finishing facility. At least one of the image, text, or the design object in the blog page can be transferred to the computer system via a computer network. The computer system can include one or more servers.

In another general aspect, the present invention relates to a computer system for creating a design for an image product. The system includes one or more servers that can identify a blog page that includes an image, text, or designs, automatically incorporate at least one of the image, text, or the design object in the blog page into the design of an image product, and allow a user to review the design of the image product. The one or more servers can communicate with a printing finishing facility that is configured to make a physical image product according to the design of the image product.

Implementations of the system may include one or more of the following. The one or more servers can obtain the number of views received by the blog page and select the blog page based on the number of views. The one or more servers can enable the user to publish the blog page and track the number of views received by the blog page. The one or more servers can obtain the number of votes on the blog page, the image, the text, or the design object and select the blog page, or at least one of the image, text, or the design object on the blog page based on the number of votes. The one or more servers can enable the user to publish the blog page and track the number of votes on the blog page. The one or more servers can determine the image formats of the image; automatically select a page layout according to the image format of the image; and automatically incorporate the image into the page layout which forms a portion of the design of the image product. The one or more servers can determine the image size of the image, automatically select a page layout according to the image size of the image, and automatically incorporate the image into the page layout which forms a portion of the design of the image product. The one or more servers can enable the user to publish the blog page. The image product can include a photobook, a photo greeting card, or photo stationery.

BRIEF DESCRIPTIONS OF THE DRAWINGS

The accompanying drawing, which are incorporated in and form a part of this specification, illustrate embodiments of the invention and, together with the description, serve to explain the principles of the invention:

FIG. 1 is a block diagram of a computer network system compatible with the present invention.

DETAILED DESCRIPTION OF THE INVENTION

Figure 1:
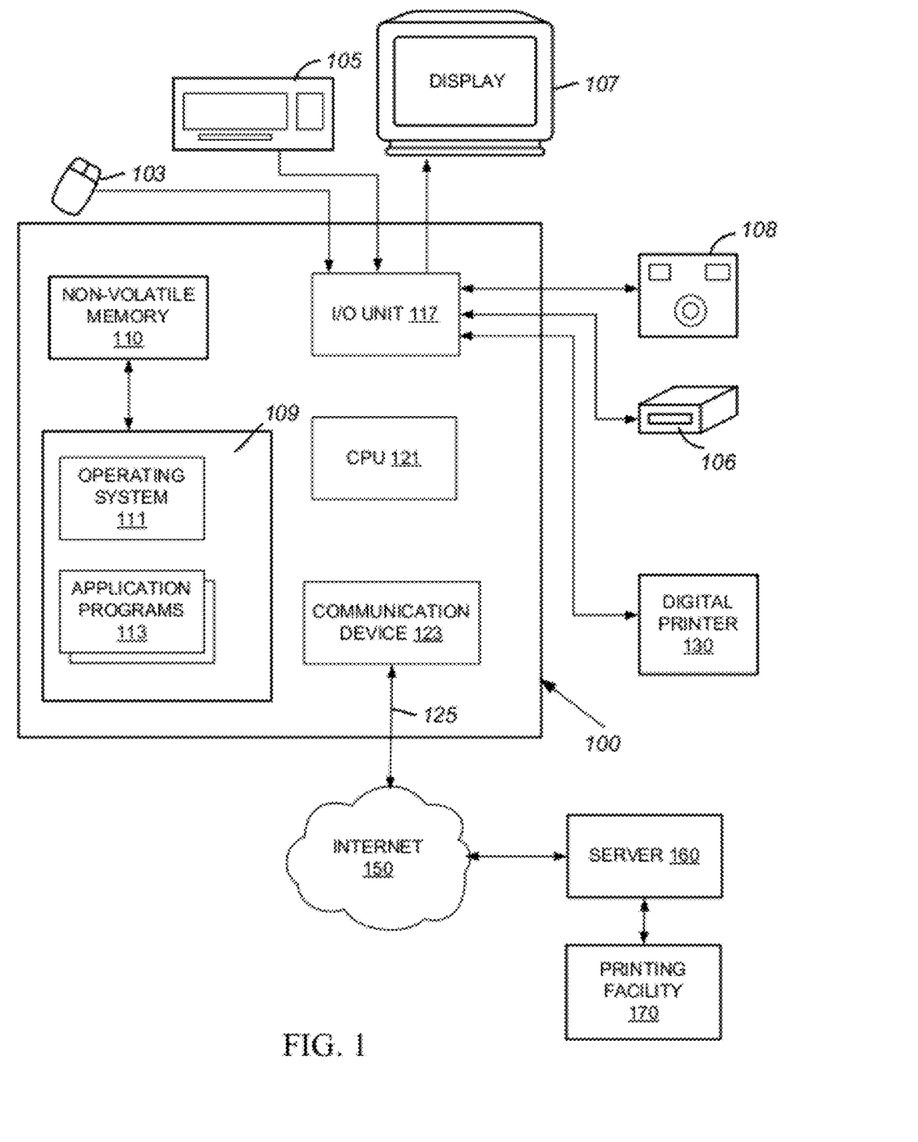
Figure 2:
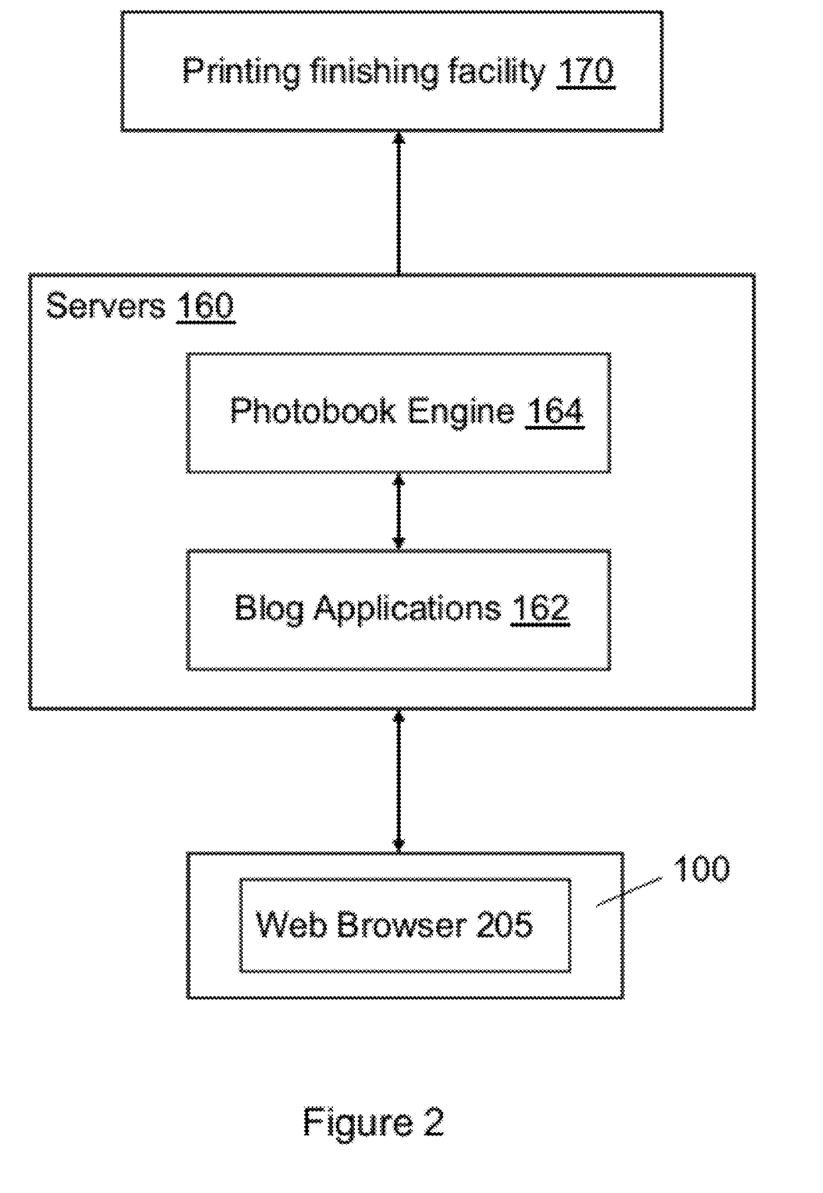
FIG. 2 shows details of the computer network system in FIG. 1.

Referring to FIGS. 1 and 2, a computer device 100 includes input/output (I/O) devices (e.g. mouse 103, keyboard 105, display 107), a central processor unit (CPU) 121, an I/O unit 117, and a memory 109 that stores data, an operating system 111, and application programs 113. The computer device 100 also includes non-volatile memory 110 and a communications device 123 for exchanging data with a network 127 via a communications link 125 such as a cable modem, DSL service or wireless Internet connection. The digital images captured by a digital camera 108 can be transferred to the non-volatile memory 110 via wired or wirelessly connections. The images can be uploaded from the computer device 100 to a server 160 via Internet 150. The computer device 100 can exist in different configurations such as a desktop computer, a laptop or tablet computer, a smart phone, etc. The computer device 100 can also include a network based system including servers, databases etc., which can provide service to remote users over a computer network such as the Internet.

Although large numbers of images are frequently captured by digital cameras, only a small fraction of the digital images are used in customized imaging products, which are available from image service providers such as Shutterfly, Inc. Customizable image products can include photobooks, photo calendars, photo greeting cards, photo stationeries, photo mugs, photo T-shirt, and so on, which can provide significant enhanced ways for preserving people's treasured memories in addition to viewing images on electronic displays.

Additionally, significant obstacles exist even for creating and obtaining customizable image products. The design of a photobook, for example, can take significant amount of time and effort. A user has to select images, often from thousands of image, for many pages including a cover page. The user needs to select a format (size and cover material) and a style for the photobook. The user needs to design or select layout and a background pattern for each page, sort images for different pages, and place images onto individual pages. The photobook design can take many iterative steps such as selecting suitable images, selecting layout, selecting images for each page, add text, which can often take hours to complete.

In the present invention, the term "photobook" refers to a book that includes multiple pages and at least one image on one of the pages, which may include photo book, photo scrapbook, photo calendars, etc. At least some of the pages include one or more images and text or image caption. The present invention concepts are also suitable for image products other than photobooks. The image products can include multiple pages (i.e. faces or views) that each can display one or more images, such as, photo greeting cards, holiday cards, multi-face photo cards, photo mugs, photo T-shirts, photo aprons, single photo pages, photo collage pages, photo stationery, photo banners, photo mugs, photo mouse pads, photo keychains, photo collectors, and photo coasters, etc.

The style and the format of the image product can have default selections. For example, a photobook can have "everyday" and hardcover book style, and 8" by 8" for the photobook format. In some embodiments, the style and the format of the photobook can be selected based on knowledge of the images in the group. Specifically, an image property can be extracted from the group of identified images. For example, if the images are identified by a common tag label "Hawaii Vacation", a photobook style for vacation, or specifically for Hawaiian vacation, may be automatically selected. In another example, if the images identified are in an electronic album called "Molly's Birthday Party", a birthday photobook style can be automatically selected.

Still referring to FIGS. 1 and 2, the servers 160 can host a website to allow users to view, edit, share, archive images. The servers 160 can include blog applications 162 that can enable a user to create, edit, update, and publish blog pages at the website. Different users can view the blog page using an application such as web browser 205 on a computer device 100 such as a lap top computer, a personal PC, or a smart phone (e.g. iPhone).

In accordance with the present invention, the servers 160 also include a photobook engine 164 coupled with the blog applications 162. The photobook engine 164 can generate designs of photobooks using the content and designs on the blog pages. The servers 160 are in communication with a printing and finishing facility 170 which can manufacture image products such as photobooks based on the designs. The blog pages can be posted at a social network web site hosted by companies such as Shutterfly, Inc., Facebook, MySpace, Photobucket, Yahoo, and Google. The photobook design can be enabled by the photobook engine 164 at the same web site or a different website from the one in which the blog pages are posted.

Referring to FIGS. 2-4B, with the assistance of the blog applications 162, a user (i.e. the owner of the blog pages) can create blog pages 400, 405 and post one or more images 410 such as "image A"-"Image F", text 420, and design objects 430 on the blog pages 400, 405.

Figure 3:
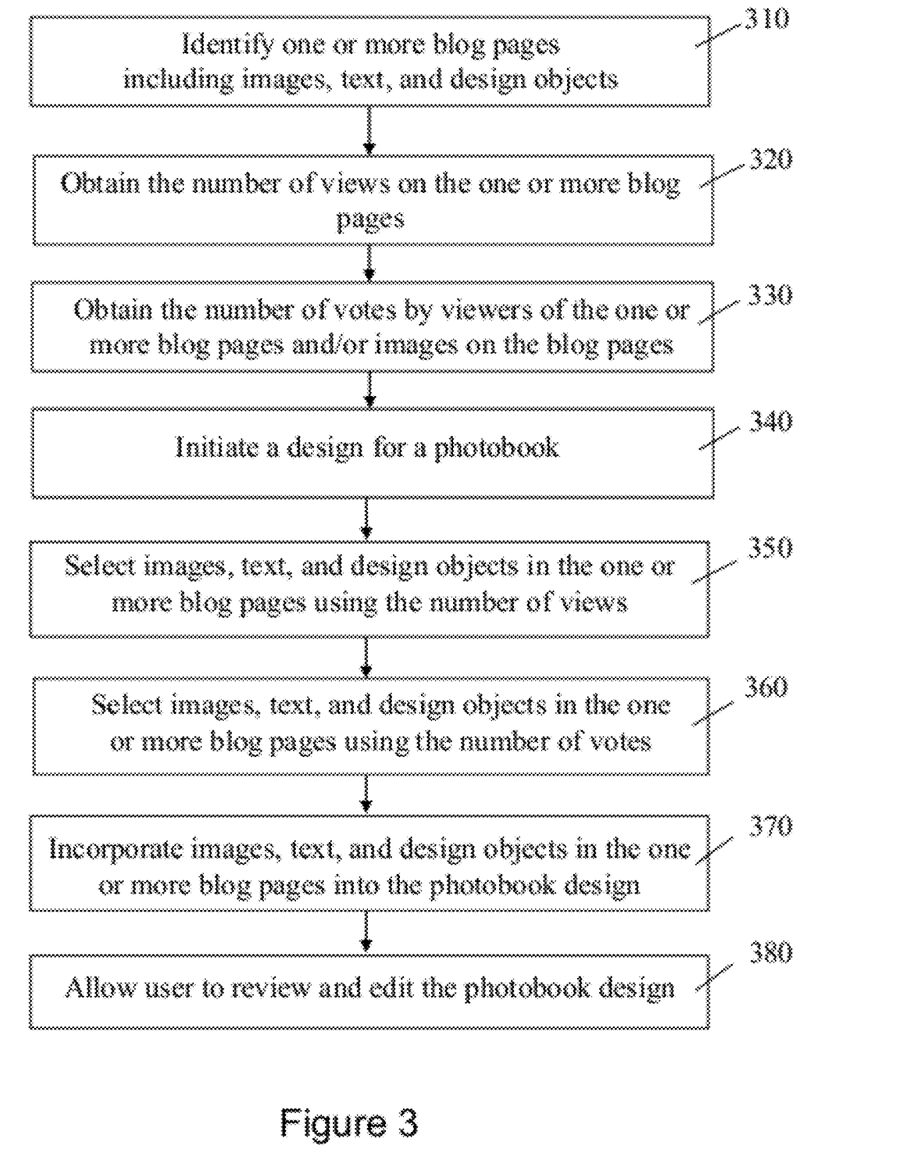
FIG. 3 shows a flow chart for creating a photobook based on the content of blog pages in accordance to the present invention.

The blog pages 400, 405 are identified by the photobook engine 164 (step 310, FIG. 3). The blog pages 400, 405 can be about a trip (e.g. a trip to Europe), a vacation, a baby, a graduation ceremony, wedding, sport games, a family reunion, etc. The blog pages 400, 405 can include comments 440 from viewers of the blog page. The text 420 can include description written by the owner of the blog pages, and comments from other users. The servers 160 (FIG. 2) can track the number of views 450 (or visits and click-throughs) that the blog page 400 or 405 or an image 410 has received. The number of views 450 is obtained by the photobook engine 164 (step 320, FIG. 3). The web site can also tally the votes 460 (or likings, or favorites) by the viewers on the blog page 400 or 405, one or more images 410, the text 420, or the design objects 430. The number of votes 460 can be obtained by the photobook engine 164 (step 330, FIG. 3).

Figure 5A:
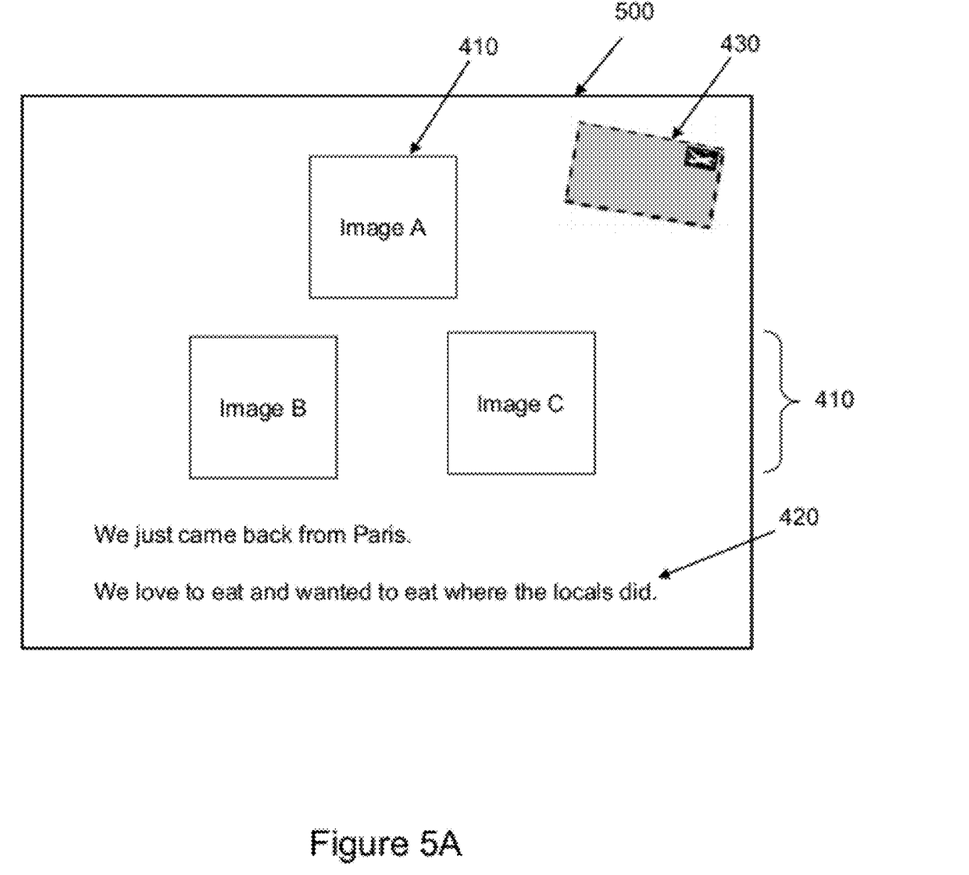
FIGS. 5A and 5B show exemplified photobook pages based on the content in the blog page in FIGS. 4A and 4B.
Figure 5B:
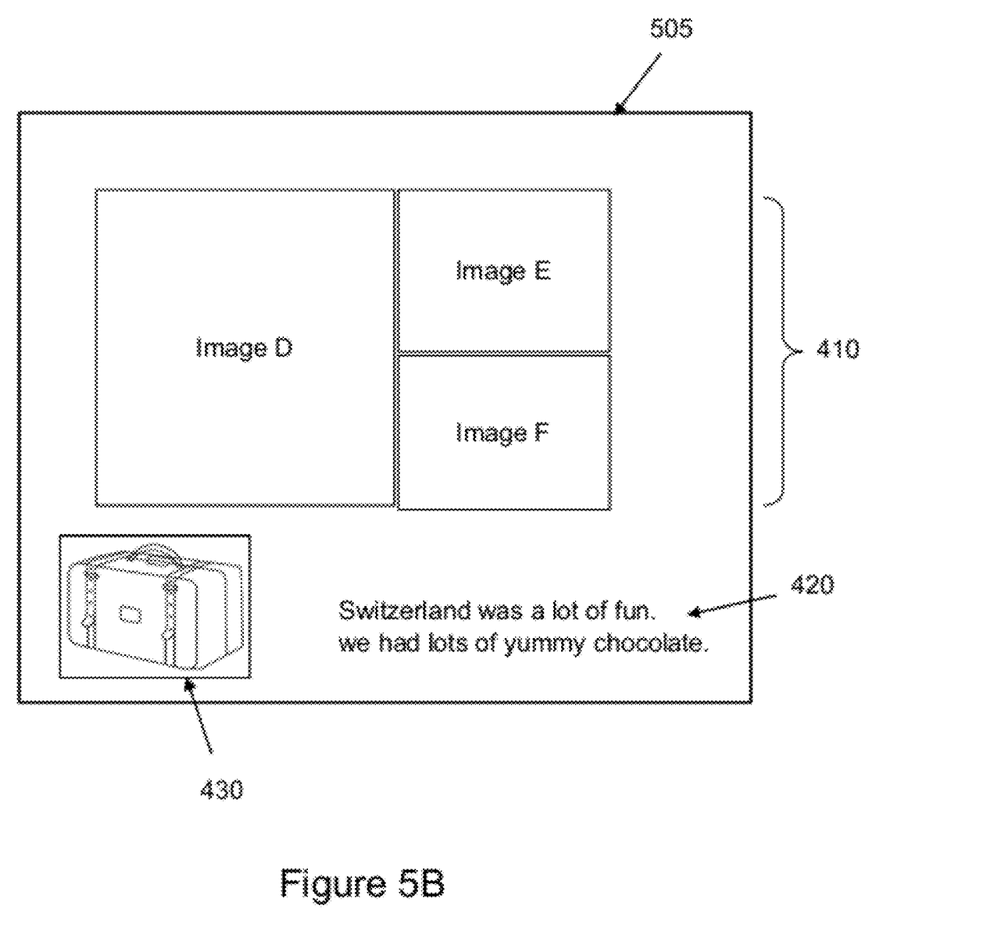

A photobook design is initiated for a user (step 340, FIG. 3). The initiation can be by a user, or automatically by the photobook engine 164. The user can be the same as the owner of the blog pages 400, 405. Alternatively, the user responsible for the creation of the photobook design can be different from the owner of the blog pages 400, 405. As shown in FIGS. 5A and 5B, a photo book design includes pages 500, 505 pages each including one or more images, text, and design objects. The photobook engine 164 can create at least a portion of a photobook design using the content from one or more blog pages 400, 405. In some embodiments, the photobook engine 164 identifies blog pages having content typically provided by the same user. The photobook engine 164 automatically incorporates the images 410, the text 420, the design objects 430, and optionally comments 440 on the blog pages 400, 405 into pages 500, 505 in the design of a photobook (step 370, FIG. 3). The photobook engine 164 can shorten the text 420 and incorporate an abbreviated version of text in the design of the photobook.

The user often has a large number of blog pages each covering a different event. Each blog page can include a plurality of images. Each image can also include multiple, and sometimes a large number of, comments.

In some embodiments, the blog pages 400, 405, the images 410, the text 420, the design objects 430, and optionally comments 440 on the blog pages 400, 405 are selected according to the views 450 (or visits and click-throughs) (step 350, FIG. 3). For example, the blog pages or images that received more visits (i.e. more popular) can be selected to be incorporated into photobooks over the ones that received fewer visits (less popular) (step 370, FIG. 3). This step can save the user from spending time on trimming out a large amount of blog content if they are all incorporated into a photobook design.

In some embodiments, the blog pages 400, 405, the images 410, the text 420, the design objects 430, and optionally comments 440 on the blog pages 400, 405 are selected according to the votes (or likings, or favorites) by the viewers (step 360, FIG. 3). For example, the blog pages that received more votes (i.e. more popular) can be selected to be incorporated into photobooks over the ones that received fewer votes (less popular) (step 370, FIG. 3).

Figure 4A:
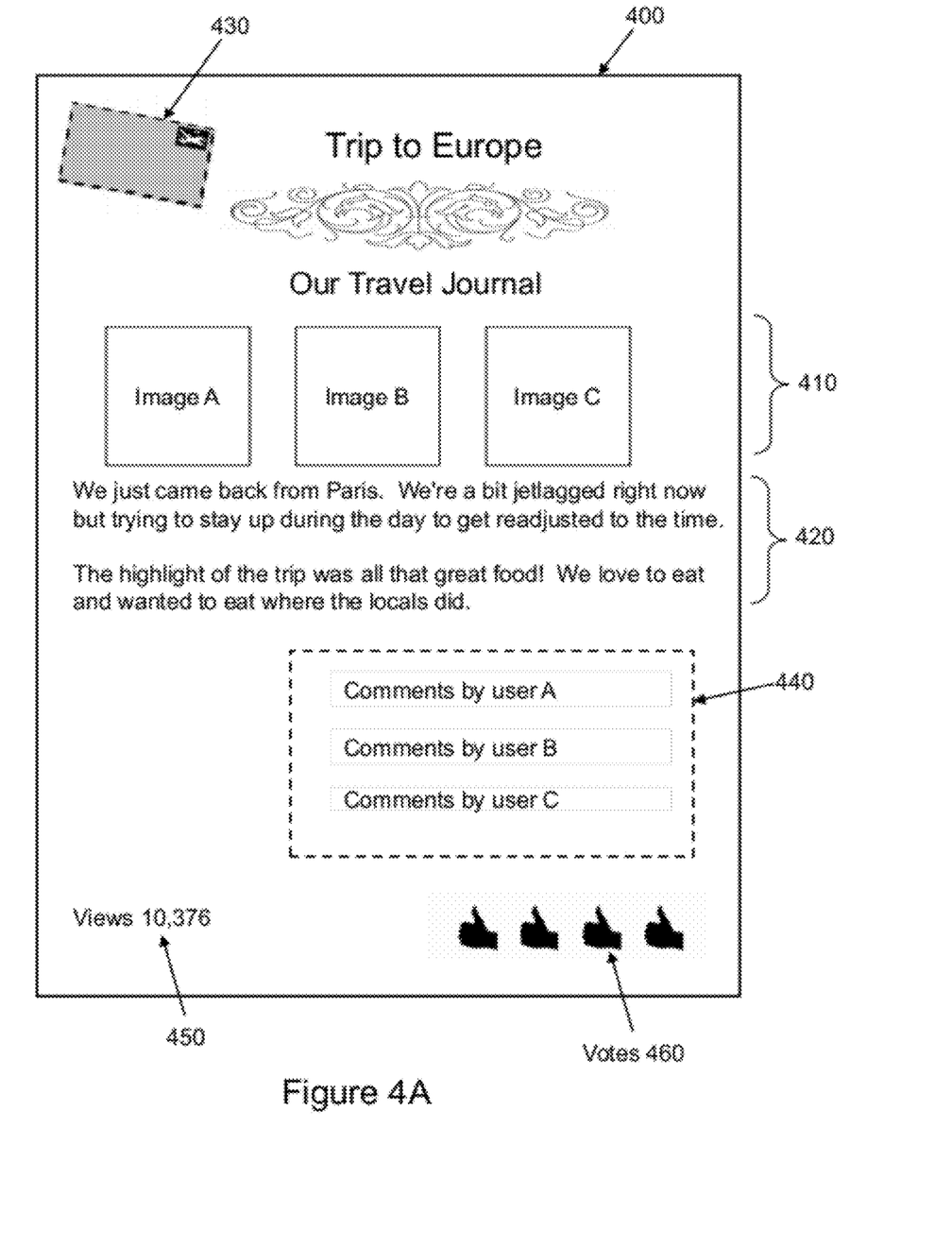
FIGS. 4A and 4B illustrate exemplified blog pages containing images, text, and design objects.
Figure 4B:
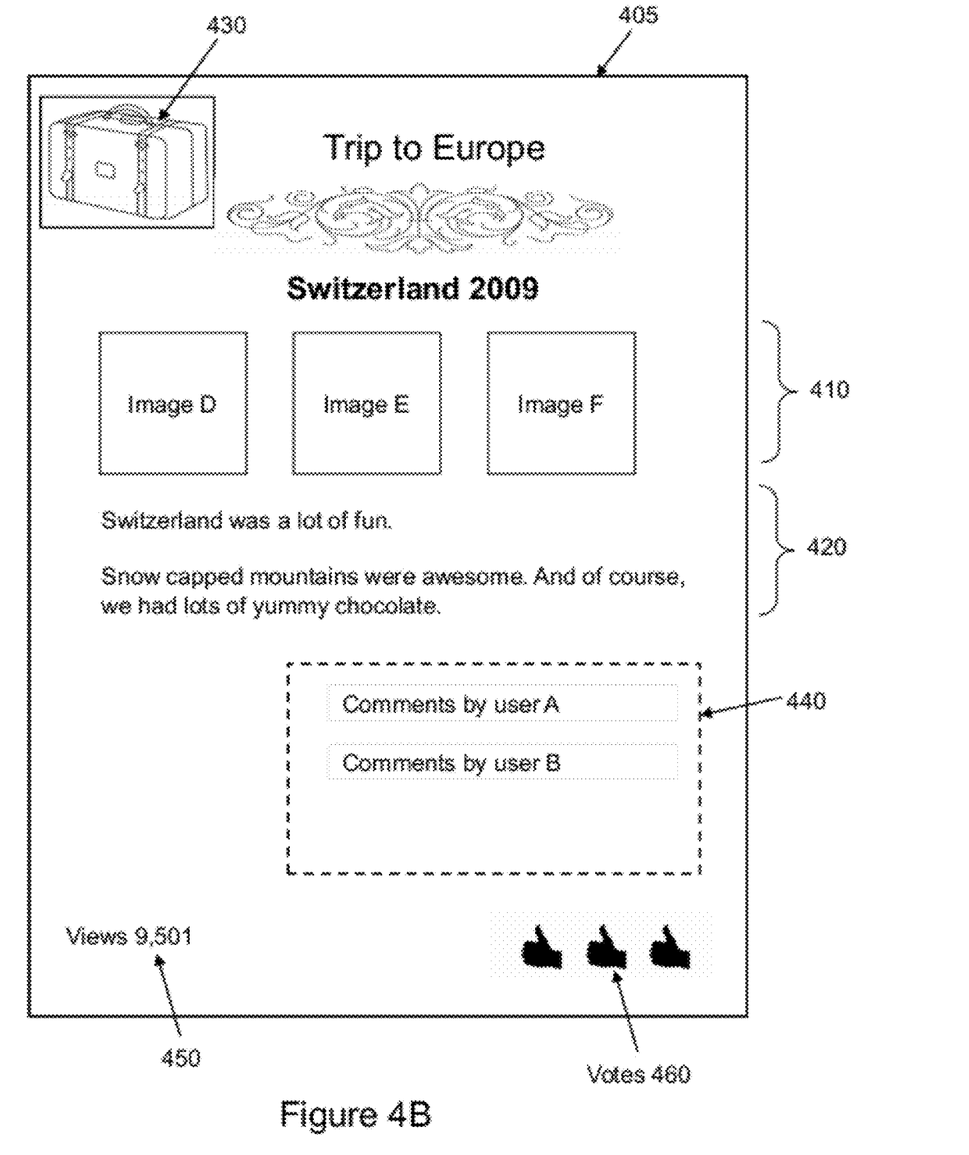
Figure 6A:
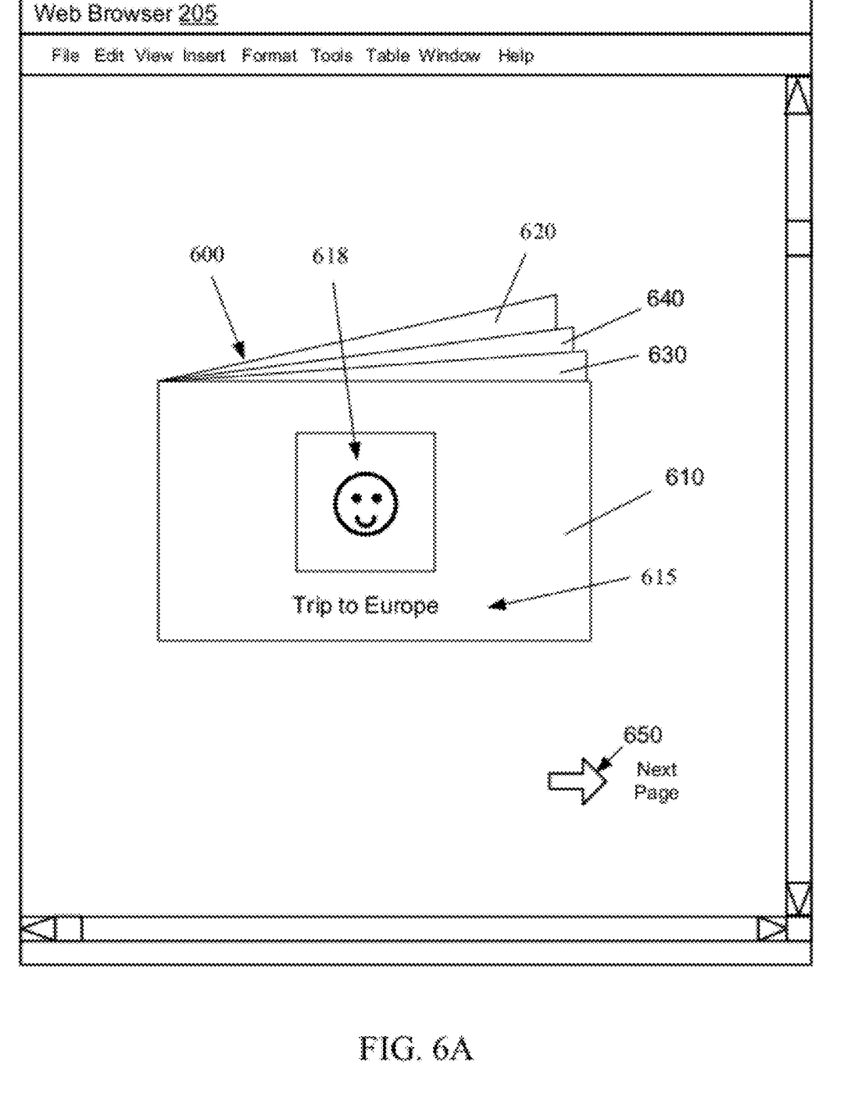
FIGS. 6A and 6B illustrate an exemplified photobook design created in accordance to the present invention.
Figure 6B:
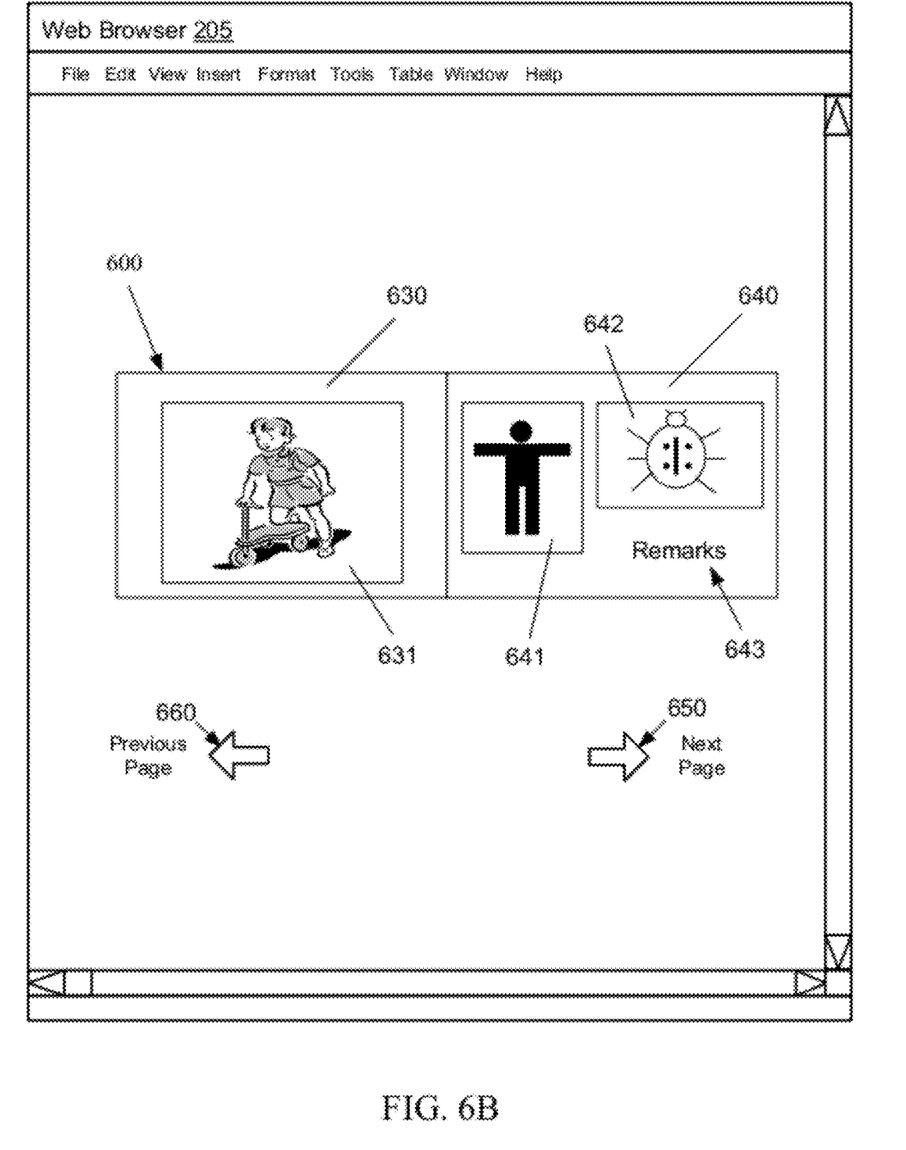

Referring to FIGS. 3, 6A, 6B, a photobook design 600 is viewable by the user in a web browser 205 on the computer device 100 (FIG. 1) during or after the completion of the photobook design 600 (step 380, FIG. 3). The photobook design 600 can include a front cover 610, a back cover 620, and a plurality of pages 630, 640. The book title can be automatically selected from the name of the image album 320. The front cover 610 can include a book title 615 and an image 618 selected from the images 410 (FIGS. 4A, 4B). The presentation of the photobook design 600 can include realistic illumination and texture to imitate effects of the materials in the selected book format. The user can click arrow buttons 650, 660 to view different pages of the photobook. The cover and different pages of the photobook design 600 can also be played automatically like a slide show. The user is allowed to edit the photobook design 600. The user can change, switch, or remove the images 618, 631, 641, and 642 on the book cover 610 and pages 630, 640. The user can also edit text and image on the pages (step 380, FIG. 3). After the user has reviewed and optionally edited the photobook design 600, the user can approve and save the photobook design 600. A physical photobook can be made according to the photobook design 600 at a printing finishing facility 170 (FIGS. 1 and 2).

It should be noted that the photobook engine 164 can automatically select page layout according to the type of content on the blog pages. For example, the number, the image sizes, and image formats (landscape and portrait) of images, the size of the text boxes, and the location and the dimensions of the design objects in a page layout can be tailored to match the corresponding properties of the images 410, the text 420, the design objects 430, and optionally comments 440 on the blog pages 400, 405 (FIGS. 4A, 4B). For example, an image 410 in landscape format and certain size will be reproduced on the page layout in landscape format and a appropriate size. A large text area is reserved for a longer text, etc.

The user has the freedom to edit and change the page layout, or select a different page layout (step 380, FIG. 3). Specifically, the images on the pages 500, 505 of the photobook design 600 can be selected to be consistent with the sizes of the images 410 on the blog pages 400, 405.

It should be understood that the presently disclosed systems and methods are suitable for creating image products other than photobooks. The image products can include multiple pages or views that each can display one or more images, such as photo books, photo calendars, photo scrapbooks, photo snapbooks, photo calendars, photobooks, and a multi-face photo card. The image products can also include a single page or view for displaying one or more images, which can include, for example, photo greeting cards, holiday cards, stationery cards, photo mugs, photo T-shirts, photo aprons, single photo pages, photo collage pages, a photo stationery, photo banners, photo mugs, photo mouse pads, photo keychains, photo collectors, and photo coasters etc.

Furthermore, it should be understood that the design of the image products can incorporate other type of content on blog pages that are not mentioned above. Additionally, with proper permission, content from the blog pages of different users can also be incorporated into a user's photobook design. Moreover, the publication of the bog pages and the design of the image products may be conducted at different websites.

What is claimed is:

1. A method for creating a design for an image product, comprising:
   storing a predetermined criterion in a computer system for automatic image product creation;
   automatically identifying, based on the predetermined criterion by the computer system, a blog page that includes an image, text, or designs to be used in an image product, wherein the predetermined criterion is based at least in part on numbers of views received by blog pages, or on numbers of votes received by blog pages, images, text or design objects on the blog pages;
   automatically incorporating, by the computer system, at least one of the image, text, or a design object in the blog page into a layout of the image product to create a design of the image product, wherein the step of automatically incorporating comprises obtaining numbers of views received by blog pages, or obtaining numbers of votes on blog pages, images, text, or design objects, wherein the step of automatically incorporating comprises selecting one of the blog pages based on the number of views, or selecting one of the blog pages, or at least one of the images, text, or the design objects on the blog pages to be used in the image product based on the number of votes; and
   allowing a user to review the design of the image product created by the computer system, wherein the computer system is configured to communicate with a printing finishing facility at which a physical image product is to be made according to the design of the image product.

2. The method of claim 1, further comprising:
   enabling the user to publish the blog pages by the computer system; and
   tracking the numbers of views received by the blog pages by the computer system.

3. The method of claim 1, further comprising:
   enabling the user to publish the blog pages by the computer system; and tracking the numbers of votes on the blog pages by the computer system.

4. The method of claim 1, wherein the step of automatically incorporating comprises:
   determining the image formats of the image by the computer system;
   automatically selecting a page layout according to the image format of the image; and
   automatically incorporating the image into the page layout which forms a portion of the design of the image product.

5. The method of claim 1, wherein the step of automatically incorporating comprises:
   determining the image size of the image by the computer system;
   automatically selecting a page layout according to the image size of the image; and
   automatically incorporating the image into the page layout which forms a portion of the design of the image product.

6. The method of claim 1, further comprising:
   automatically selecting a layout based on the image, text, or a design object in the blog page identified by the computer system.

7. The method of claim 1, wherein the image product comprises a photobook, a photo greeting card, or photo stationery.

8. The method of claim 1, wherein the blog page is posted by the user.

9. The method of claim 1, further comprising:
   receiving an order from the user for a physical image product; and
   making the physical image product according to the design of the image product at the printing finishing facility.

10. The method of claim 1, wherein at least one of the image, text, or the design object in the blog page is transferred to the computer system via a computer network.

11. The method of claim 1, wherein the computer system comprises one or more servers.

12. A computer system for creating a design for an image product, comprising:
   one or more servers configured to store a predetermined criterion in a computer system for automatic image product creation, automatically identify, based on a predetermined criterion, a blog page that includes an image, text, or designs to be used in an image product,
   wherein the predetermined criterion is based at least in part on numbers of views received by blog pages, or on numbers of votes received by blog pages, images, text or design objects on the blog pages,
   wherein the one or more servers are configured to obtain numbers of views received by blog pages, or to obtain numbers of votes on blog pages, images, text, or design objects,
   wherein the one or more servers are configured to select one of the blog pages based on the number of views, or to select one of the blog pages, or at least one of the images, text, or the design objects on the blog pages based on the number of votes,
   wherein the one or more servers are configured to automatically incorporate at least one of the image, text, or the design object in the blog page into a layout of the image product, and to allow a user to review the design of the image product created by the one or more computer servers, wherein the one or more servers is configured to communicate with a printing finishing facility that is configured to make a physical image product according to the design of the image product.

13. The computer system of claim 12, wherein the one or more servers are further configured
   to enable the user to publish the blog pages; and
   to track the numbers of views received by the blog pages.

14. The computer system of claim 12, wherein the one or more servers are further configured
   to enable the user to publish the blog pages; and
   to track the numbers of votes on the blog pages.

15. The computer system of claim 12, wherein the one or more servers are further configured
   to determine the image formats of the image;
   to automatically select a page layout according to the image format of the image; and
   to automatically incorporate the image into the page layout which forms a portion of the design of the image product.

16. The computer system of claim 12, wherein the one or more servers are further configured
   to determine the image size of the image;
   to automatically select a page layout according to the image size of the image; and
   to automatically incorporate the image into the page layout which forms a portion of the design of the image product.

17. The computer system of claim 12, wherein the one or more servers are further configured to automatically select a layout based on the image, text, or a design object in the blog page identified by the one or more servers.

18. The computer system of claim 12, wherein the image product comprises a photobook, a photo greeting card, or photo stationery.

* * * * *